(12) United States Patent
Humphrey et al.

(10) Patent No.: US 9,210,256 B1
(45) Date of Patent: Dec. 8, 2015

(54) MONITORING MOBILE DEVICE AND VEHICLE USE TO DETECT INAPPROPRIATE USE

(76) Inventors: Thomas W. Humphrey, Glendale, OH (US); Steven L. Zimmers, Cincinnati, OH (US)

( * ) Notice: Subject to any disclaimer, the term of this patent is extended or adjusted under 35 U.S.C. 154(b) by 0 days.

(21) Appl. No.: 13/590,131

(22) Filed: Aug. 20, 2012

Related U.S. Application Data

(63) Continuation-in-part of application No. 13/463,812, filed on May 3, 2012, now abandoned.

(60) Provisional application No. 61/482,003, filed on May 3, 2011.

(51) Int. Cl.
*H04M 3/42* (2006.01)
*H04M 3/22* (2006.01)

(52) U.S. Cl.
CPC .................................. *H04M 3/2281* (2013.01)

(58) Field of Classification Search
USPC ........ 455/405, 414.1–414.2, 418–420; 701/1, 701/31.4, 468; 340/438, 426.28, 439
See application file for complete search history.

(56) References Cited

U.S. PATENT DOCUMENTS

| | | | |
|---|---|---|---|
| 5,570,087 A * | 10/1996 | Lemelson ................. | 340/870.05 |
| 6,405,112 B1 * | 6/2002 | Rayner ......................... | 701/33.4 |
| 6,690,940 B1 | 2/2004 | Brown et al. | |
| 8,527,013 B2 | 9/2013 | Guba et al. | |
| 8,655,965 B2 | 2/2014 | McWithey et al. | |
| 8,761,821 B2 | 6/2014 | Tibbitts et al. | |
| 8,787,936 B2 | 7/2014 | Tibbitts et al. | |
| 2003/0134627 A1 * | 7/2003 | Himmel et al. ............... | 455/419 |
| 2006/0111822 A1 * | 5/2006 | Simon ............................ | 701/29 |
| 2006/0212195 A1 * | 9/2006 | Veith et al. ..................... | 701/35 |
| 2008/0064446 A1 * | 3/2008 | Camp et al. ................... | 455/565 |
| 2008/0085689 A1 * | 4/2008 | Zellner ...................... | 455/187.1 |
| 2008/0294302 A1 * | 11/2008 | Basir ................................ | 701/2 |
| 2008/0319602 A1 * | 12/2008 | McClellan et al. ............. | 701/33 |
| 2009/0221279 A1 * | 9/2009 | Rutledge ....................... | 455/418 |
| 2009/0298482 A1 * | 12/2009 | Yen et al. .................... | 455/414.2 |
| 2010/0250052 A1 * | 9/2010 | Ogino ............................ | 701/33 |
| 2011/0270784 A1 * | 11/2011 | Padia et al. ................... | 705/500 |
| 2012/0015690 A1 * | 1/2012 | Miao .......................... | 455/556.1 |
| 2012/0040650 A1 * | 2/2012 | Rosen ......................... | 455/414.1 |
| 2012/0326855 A1 * | 12/2012 | Bantz et al. ................... | 340/439 |
| 2013/0316737 A1 | 11/2013 | Guba et al. | |

\* cited by examiner

*Primary Examiner* — Nathan Taylor
(74) *Attorney, Agent, or Firm* — Wood, Herron & Evans, LLP

(57) ABSTRACT

The inappropriate use of a mobile device and/or a motor vehicle may be ameliorated through audit by a supervisor, parent or peer using a system that monitors vehicle movements and mobile device use and notifies the supervisor, parent or peer of potentially inappropriate use, such as simultaneous vehicle and mobile device use, use of the mobile device generally at times when such use is normally inappropriate according to a calendar of events, and use of the motor vehicle generally at a location or at a time and location that is normally inappropriate.

19 Claims, 4 Drawing Sheets

FIG. 3A

| Date | Time | Dialed Number | Minutes | Device Location | Dialed Location | Call Rate |
|---|---|---|---|---|---|---|
| x | x | x | x | x | x | x |
| x | x | x | x | x | x | x |

FIG. 3B

| Date | Time | Location |
|---|---|---|
| x | x | x |
| x | x | x |

FIG. 3C

| Date | Time | Minutes of Operation | Location Perimeter |
|---|---|---|---|
| x | x | x | x |
| x | x | x | x |

FIG. 3D

| Date | Time | Minutes of Operation | Minimum Speed |
|---|---|---|---|
| x | x | x | x |
| x | x | x | x |

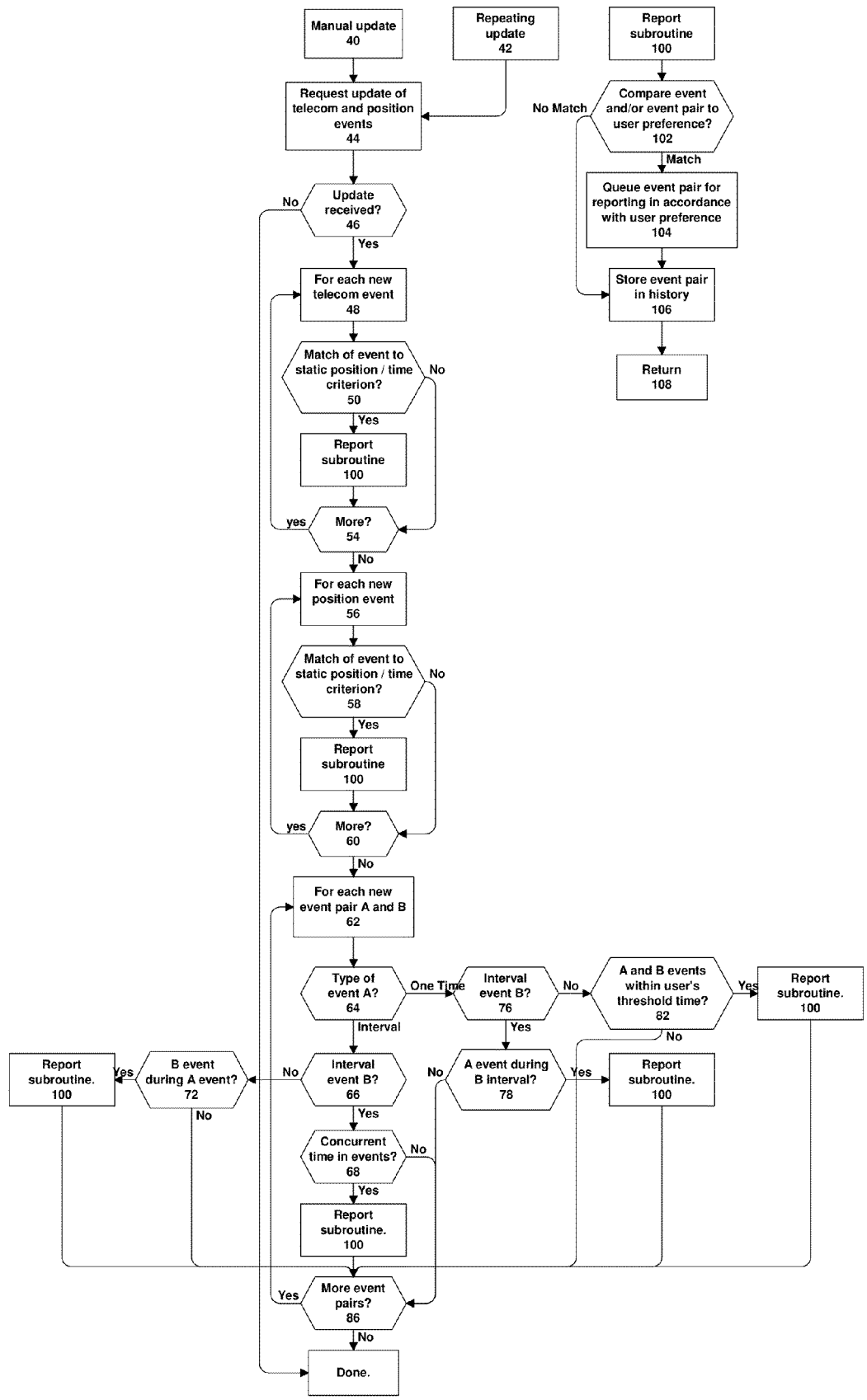

MONITORING MOBILE DEVICE AND VEHICLE USE TO DETECT INAPPROPRIATE USE

FIELD OF THE INVENTION

The present invention relates to monitoring and reporting on the use of a mobile device in inappropriate circumstances, such as while driving.

BACKGROUND OF THE INVENTION

Mobile devices, sometimes known as "smart phones", or "personal digital assistants", have become very popular recently. Unfortunately, the rise in popularity of these devices has been accompanied by a rise in irresponsible use of these devices. In particular, mobile device use while driving a motor vehicle has been linked to numerous accidents, and been compared to drunk driving. Mobile device use in movie theaters has become a common irritant to attendees at movies, theaters and churches, leading to repeated reminders and admonitions prior to movies asking cell phone users to turn off their devices. Mobile devices in classrooms raise the dual threats of student distraction and academic dishonesty.

To respond to the specific problem of mobile device use in automobiles, applications and devices have been proposed that seek to disable or prevent the use of a mobile device while driving. For example, published US Patent Applications 2011/0009107 and 2010/0210254 propose the introduction of additional software into a mobile device that will detect or prevent attempted use while in a moving vehicle. This software interacts with a device on the On Board Diagnostics (OBD-II) port on a vehicle which can monitor whether the vehicle is in motion. A product implementing this concept is presently available for sale under the tradename "Safe Driving System", sold by Safe Driving Systems, LLC, and can be seen at the web site safedrivingsystems.com.

To respond to the use of mobile devices in theaters, classrooms or similar environments, devices have been implemented that jam cellular frequencies in the vicinity of the classroom, theater, or other location. By placing such devices in a theater or classroom, the use of a telephone can be effectively prevented.

Unfortunately, the existing systems suffer from a number of limitations. First, systems that require software installation on the mobile device may only be implemented on devices that permit the installation of third party applications, such as Apple iOS devices such as the iPhone and iPod Touch, for Android-powered devices such as the Motorola Droid device, Windows Mobile powered devices, and Blackberry devices. Many mobile phones presently in use, even those provide telephone, text and internet browsing, do not support third party applications and thus are not eligible for use with these programs.

Further, systems that rely upon software interlocking are subject to being defeated by software hacking, and industrious persons wishing to overcome a lockout, have always been able to do so.

Finally, jamming cellular frequencies, or interlocking a phone to a car to prevent its use, may well prevent uses that may be otherwise benign or, in fact necessary; for example, a passenger in a vehicle may wish to use a device that is interlocked to the car, and be prevented from doing so. A person outside the theater may be unable to send a necessary text message to a friend about their planned meeting. Or, the driver of a vehicle may need to place a call to a number while the vehicle is moving, to a friend regarding an accident, the driving behavior of the friend, or to warning of a threat from weather or other persons.

In short, it is not easy to predict and accurately detect those circumstances where it is appropriate to use a mobile device in a moving vehicle or another location, even though it would normally be inappropriate. Indeed, mobile devices are often sold and purchased as a safety device, because they permit immediate communication in circumstances where it may be necessary to prevent or ameliorate injury to persons or property, and for just this reason, systems seeking to block such communication in certain circumstances will always bear the risk of defeating the essential safety purpose of the device.

Thus, there remains a need for a system and method to more effectively deal with the use of mobile devices in vehicles and in other circumstances the timing and geographic routing of those devices and/or those vehicles in consideration of proscribed locations or times of certain activities, and/or the simultaneous use of the vehicle and mobile device, thus maintaining the safety and efficiency benefits of responsible device use, while allowing the monitoring and prevention of irresponsible uses. Further, there remains a need for a system of this type that is not readily subject to defeat or circumvention.

SUMMARY OF THE INVENTION

In one aspect, the present invention is directed to a method and system that meets this need by monitoring and reporting upon the use of one or more mobile devices and one or more moving vehicles, such that a responsible person such as a parent or manager may be alerted to a use that fails to meet predefined criteria.

For example, one criterion may be to notify of simultaneous use of the vehicle and mobile device. Another criterion may be to notify of vehicle use outside of a specific geographic area, or within a specific geographic area, at any time or at a particular time. Another criterion may be to notify of mobile device use in a specific geographic area, or outside of a specific geographic area, at any time or at a particular time. Still another criterion may be the use of the vehicle or mobile device, regardless of location, in a particular window of time.

By generating notifications of events or combined events that meet defined criteria, the system enables the responsible person to be aware of the event and to investigate its circumstances. The responsible person is thus enabled to know of a use that may be inappropriate and to take disciplinary action where needed.

The need for such monitoring particularly arises where a supervisory relationship exists between one person, such as a parent and child, or between a business owner and employee. In these cases, the supervisory person provides a vehicle and mobile device, and the supervised person uses the vehicle and mobile device. The supervisory person thus carries an obligation to ensure the resources they have provided are used appropriately and safely. Supporting this, the tort law concept of respondeat superior may be used to attribute liability to a master for the torts committed by their servants, particularly where the equipment used in the commission of the harm (e.g. the vehicle and the mobile device that provided the distraction) were provided by the master.

BRIEF DESCRIPTION OF THE DRAWINGS

The present invention will be more fully understood by reference to the following drawings, in which:

FIG. 3A illustrates the format of exemplary data available from a wireless carrier and usable according to principles of the present invention to define events or ranges of time characterized by use of a mobile device for one of text, voice and data;

FIG. 3B illustrates the format of exemplary data available from a motor vehicle monitoring device such as the device shown in FIGS. 2A-2C, or another device providing similar functionality, including position and time data; FIG. 3C illustrates another format of exemplary data from such a device, including time range and location perimeter (boundary) data; and FIG. 3D illustrates yet another format of exemplary data from such a device, including time range and speed data;

FIG. 4A is a flow chart of actions taken by the web server, database server and email server of FIG. 1 to carry out aspects of the invention, and FIG. 4B is a flow chart of an event reporting subroutine for FIG. 4A.

DETAILED DESCRIPTION

Figure 1:
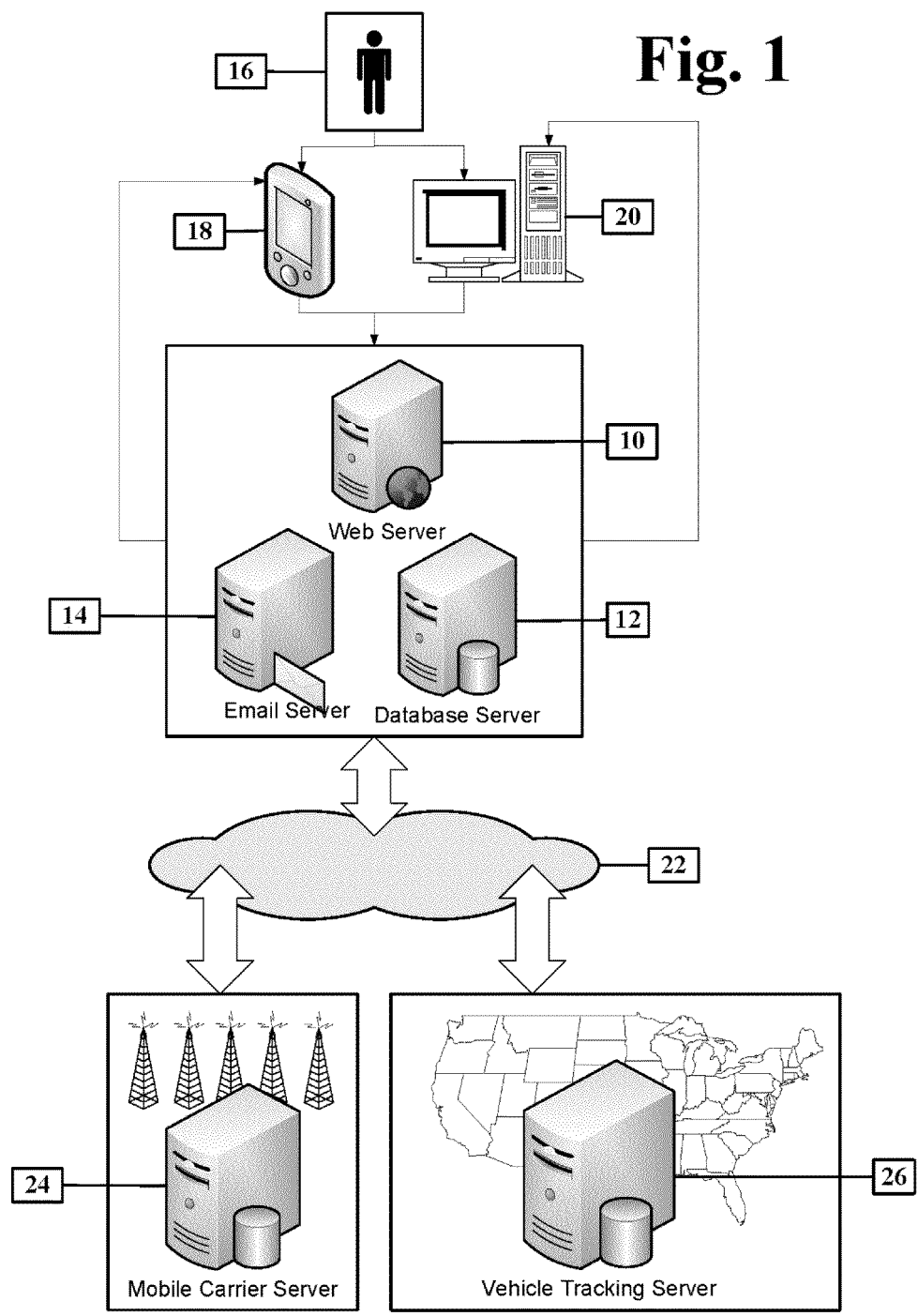
FIG. 1 illustrates a consumer of the service contemplated herein, connecting through a portable device or computer to a web server, mail server and the content in a database server, to define and receive notifications relating to activities of a mobile device which is supplied with data, text and voice services by a carrier, and to define and receive notification relating to the activities of a vehicle.

In the illustrated specific embodiment of the invention, a responsible person such as a parent or manager, obtains information on the use of a motor vehicle using a device such as that shown in the above-referenced U.S. Patent Application Publications, or the device described in U.S. Pat. No. 6,064, 970, which is presently in public use by Progressive Insurance through their Snapshot insurance profiling program, or the device that is publicly available from Safe Driving Systems, LLC, or the device that is publicly available under the trademark "Entourage" from Blackline GPS, Corp. of Calgary, Alberta, Canada, or the device sold under the tradename "Family CoPilot" by Hughes Telematics, Inc., hughestelematics.com, 2002 Summit Blvd., Suite 1800, Atlanta, Ga. 30319. Each of these devices can be attached to a vehicle and will generate regular reports of the movements and activities of the vehicle. The Snapshot device described in U.S. Pat. No. 6,064,970 and the Blackline GPS device report movements to a remote server via wireless communication, so that the wireless server has continuous data on the activity of the vehicle. An attempt to defeat these reports by unplugging the device will create an exception report on the server, which a parent or manager can investigate; thus, there is little opportunity to circumvent the vehicle monitoring by unplugging or jamming the device.

The illustrated embodiments of the invention further uses data on the device provided by the mobile device carrier. While there are numerous mobile device carriers having very different billing practices, carriers generally permit customers full access to reports of text message (SMS), voice calls, and data usage listed by each billed customer device, as part of their regular customer service functions. Verizon Wireless, as an example, provides this data to individual customers in a web page format, or as a downloadable spreadsheet, on a month-by-month basis. Business or other organizational customers can arrange for bulk reporting of this data by downloadable file or other delivery methods such as CD-ROM, but even absent this accommodation, usage data is available through existing Internet/web site portals. Wireless carriers make a complete audit record of all calls, SMS and data usage of each device in order to support service charges for voice, data and text message (SMS) usage, which makes it likely that such data will remain available for the long term. Thus, a parent or manager of a business will be able to obtain reports for those devices they have provided to children or employees.

In accordance with principles of the present invention, an audit process is implemented in which data from the vehicle monitoring device is compared to device usage data from the carrier, to identify periods of time that a target vehicle was in motion or operating, and simultaneously, telephone, text, or data communication was underway to the mobile device. This comparison is readily accomplished upon two data sets each of which is time and date stamped, as is the case with reports from the vehicle monitoring devices described above, and the carrier usage records available from mobile providers. Notably, while mobile carriers may make it difficult for persons other than the account owner to obtain this data, in accordance with the envisioned embodiment of the present invention, the account owner would be the parent or manager that provided the mobile device, and thus will have the ability to directly access this data, and combine it with data regarding vehicle use that is available through the above-noted devices.

The audit function described herein may be performed manually, but it is within the scope of the present invention to automate this audit function, by performing automatic comparison of vehicle and device usage records and flagging those instances of simultaneous vehicle and mobile device, so that there can be an investigation by the responsible person. The automation of this process may involve a browser plug-in or desktop application that may, in a scripted fashion, automate the process of logging in to a wireless carrier's web site to obtain data, and also automate the process of acquiring vehicle activity reports from the server that collects such information from the device installed in the vehicle. The specific script that is needed to obtain data from the wireless carrier will vary depending upon the carrier's web site design, and may need to be updated as that web site design is modified, however, this is within the scope of skilled web programmers. If the service described herein becomes more commonplace, however, carriers may better automate the access by subscribers to their data for auditing purposes and thus simplify the task of acquiring this data for audit functions such as are described herein. It is also apparent that the comparison and flagging of instances of simultaneous usage between the vehicle and device, or the device and its approximate location based on the vehicle destination can be evaluated in the context of pre-defined user preferences of the responsible person. The responsible person can define for each device, acceptable usage and unacceptable usage, based on where the device has arrived proximal to the transport vehicle destination and also define acceptable time parameters for the device usage while the device remains at that location. For example, a child with a mobile device can drive to school, but is not allowed to use that device in class, but can use it during lunch for a period of time Monday through Friday.

It will be appreciated that simultaneous use of a motor vehicle and mobile device may be further evaluated based upon the speed and location of the vehicle. For example, use of a mobile device on an interstate in light traffic may be evaluated different than use in heavy traffic or on local roads where pedestrians are likely to be present. Furthermore, use of a mobile device at speeds of, e.g., less than 5 MPH, may be treated different than uses at higher rates of speed, and thus it is within the scope of the present invention to consider the specifics of the location of the simultaneous uses of the vehicle and mobile device, and the speed of travel of the vehicle, in determining whether an event should be brought to the attention of an auditing person.

Moreover it will also be appreciated that the origination of a telephone call involves greater personal attention by a mobile device user than, for example, the receipt of a telephone call, particularly where a hands-free system is in use in the vehicle. Also, the receipt of a text message demands less attention of a vehicle operator than the origination of a text message. Thus, it is within the scope of the present invention to separately process the origination of telephone calls and differently handle the answering of telephone calls, and potentially to change the manner in which such events are handled depending upon the existence of a hands-free (aka Bluetooth) system within the vehicle. E.g., the origination of a call may generate a notice but the receipt of a call may not generate a notice unless the vehicle lacks a handsfree system. Further, it is within the scope of the present invention to differently handle the origination and receipt of text messages such that, for example, the receipt of a text message does not generate a notice that would be generated upon origination of a text message.

Although the invention has thus far been described in the context of supervisory relationships, it is within the scope of the present invention that persons with peer relationships may use the invention, as well as persons in supervisory relationships. For example, accountability can be enabled by the present invention: a husband and wife, or two friends, may agree to be notified of the others' activity using the inventive audit process, and through this form of accountability, each may be driven toward a personal commitment to eliminate or cut back on irresponsible use of mobile devices.

It is also within the scope of the invention to monitor irresponsible use of mobile devices in other circumstances than in a moving vehicle. For example, other circumstances requiring undivided attention, or where such attention is desired, may be identified by time and date, and then monitored for the use of a mobile device. For example, classroom times, particularly examinations, continuing education events, theater, recital and movie performances, and other such events, in most circumstances, should not be interrupted by mobile device use. A parent, manager/supervisor, or accountability peer, may audit such uses if the times of such events are defined in a calendar accessible to the audit system. By defining such events in a calendar, the auditing party can cause the audit system to flag and give notice of mobile devices during events or in circumstances where it is likely to be inappropriate. In a rudimentary implementation of this concept, a parent may define the school hours for a child and be notified of any mobile device use during school hours, which can be a subject of further investigation. In more complex implementations, the auditing party may define a daily or monthly calendar of events in addition to school times and vehicle uses during which it would be generally inappropriate times for mobile device use—e.g., normal sleeping times, athletic or musical practice/lesson times, defined homework times, all can be readily identified and scheduled for audit. The inventive system can compare these times, as well as times of detected motor vehicle use, and compare these times to records of mobile device use to identify inappropriate uses for the parent, manager/supervisor, or accountability peer to investigate to ameliorate, if necessary.

It will be appreciated that data on the movement of a vehicle such as obtained through the devices referenced above may also be used in conjunction with a calendar of expected activities to identify other inappropriate behaviors. For example, if a student's vehicle is not parked at a school parking lot during school hours, this may indicate truancy. Similarly, if an employee's vehicle is away from the office during business hours, or is not parked during a business trip, this may indicate unreported absenteeism or expense report fraud.

As a further aspect, motor vehicle movements may be evaluated in conjunction with other data sources to identify potentially inappropriate behavior, absent any mobile device use. For example, a database may be formed that identifies suspect travel locations, such as areas known for drug trafficking, prostitution, gambling, merchants of pornographic material, so-called red-light districts, and the like. Travel of a vehicle into these areas, regardless of any other behavior may be flagged using a database of geographic locations of interest, and brought to the attention of an auditing person for evaluation. Further, travel through these areas may be more subject to suspicion after daylight hours, and thus the location and the time of entry into the location may together form a criterion for bringing an event to the attention of an auditing person.

Referring now to FIG. 1, an exemplary environment for implementation of the present invention includes a web server 10, in communication with a database server 12 and email server 14. As elaborated below, database server 12 stores records of vehicle and device use, as well as criteria to be compared to those uses to determine when notices to responsible persons should be generated. Interaction with the database is via web server 10 and to a limited extent via email server 14, which transmits the notices referenced herein and may also be utilized in a process for establishing and maintaining a user account by association of the user with a unique email address, which can be confirmed by the delivery of a confirming URL via email to that email address.

A user 16, such as a responsible person or potentially a monitored person having control of a vehicle and/or mobile device under supervision of the responsible person, accesses information from web server 10 via a mobile device 18 and/or computer 20 which may be a desktop, laptop or palmtop computer. Mobile web pages or custom applications for mobile devices may be used with equal effect to interact with the system and obtain updates and configure settings such as notification criteria. Other functions available through the web server may include accessing historical records of events of interest and viewing geographic profiles of those historical events for the purpose of analyzing and identifying troublesome scenarios and behavioral patterns of the supervised person. The gathering of the required historical information is referenced below in connection with FIG. 4.

Figure 2A:
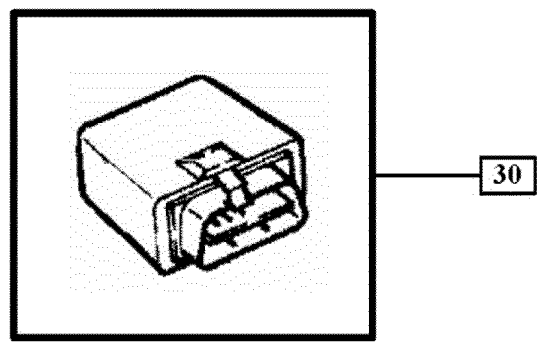
FIG. 2A illustrates a vehicle monitoring device that is connectable to the On Board Diagnostics port of a vehicle.
Figure 2B:
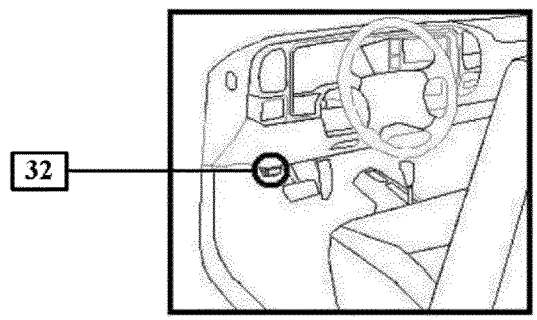
FIG. 2B illustrates the connection of the device to the vehicle.
Figure 2C:
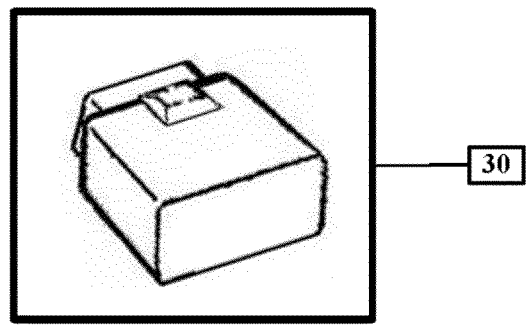
FIG. 2C is a rear view of the device as seen from the cockpit when installed in a vehicle.

Referring now to FIG. 2A, an exemplary motor vehicle tracking device in accordance with principles of the present invention is in the form of a 'dongle' or small extension device 30 which is attachable to the On Board Diagnostics (OBD) port 32 of a motor vehicle, which is typically located beneath the dashboard of the vehicle as seen in FIG. 2B. The device incorporates circuitry for obtaining power from the OBD connector, reading vehicle data such as vehicle speed and engine RPM (and by implication running status). The device further includes a GPS receiver and/or cell tower based locating system for determining the location of the motor vehicle, and finally, the device includes a cellular modem and antenna for transmitting reports of location and operation of the vehicle to server 26. As seen in FIG. 2C the rear of the device exposed to the vehicle cockpit is a generally blank housing which contains the described electronics but is relatively nondescript.

Referring now to FIG. 3A, exemplary data available from a cellular carrier typically includes the date and time of a voice, data or text messaging event, as well as a dialed number (if applicable) and a number of minutes of connection (for telephone connections or long term data streams). Further, data available from a carrier may also include the location of the mobile device during the telecom event, the location dialed or messaged, and a calling rate such as day or evening—or the applicability of a discount plan such as 'friends and family'. This data may be used to identify a time or time range of the origination or receipt of a text message, telephone call, or the location of the same, which may be compared to the times of use of a motor vehicle or compared to static criteria—such as a window of time during the school day when cell phone use by a student is prohibited by his or her parents, a location such as the school grounds where calling is prohibited. Furthermore, a telephone number or calling rate may be restricted or otherwise made subject to investigation. For example a parent may restrict calling of a child to the discounted time periods and/or discounted numbers in a 'friends and family' plan, or may forbid calling of unknown numbers, or numbers of acquaintances that are seen to be bad influences.

As seen in FIG. 3B, data available from a motor vehicle tracking system may include date and time and location data, which may be differentiated to identify a vehicle speed and direction, and compared to static locations of interest in accordance with principles of the present invention.

As seen in FIG. 3C, in one embodiment the vehicle tracking system may present data in a more compacted form in which behavior of the vehicle over a period of time is presented. For example, a starting date and time and period of minutes may be associated with a location perimeter representing the geographic area that the vehicle operated within during that period of time. Thus if a vehicle operated within a particular suburban area for a length of time this can be represented simply by a date, time, length of minutes, and coordinates of metes and bounds of an area of operation. FIG. 3D illustrates another alternative in which the vehicle tracking system identifies a date and time and duration during which the vehicle operated within a particular speed range. For example, the vehicle may have operated at speeds above 25 MPH during an extended highway drive, and then at speeds below 25 MPH during a local surface road journey to a destination. A representation such as seen in FIGS. 3B and 3C provides a summary of vehicle operation in a relatively compressed format that is nevertheless sufficient for evaluation of appropriate use in accordance with many possible criteria.

Referring now to FIG. 4A, a process for evaluation of event information such as seen in FIG. 3A-3D may be initiated upon a manual request for an update 40, or a repeating automatic updating process 42. In either event, a first step is to request an update of telecom and position events from the mobile carrier servers 24 and vehicle tracking server 26 (FIG. 1). If no updates are received (46), then the process is complete. If, however, updates are received, then beginning at step 48, for each new telecom event that is received (such as in the format of FIG. 3A), the event is compared 50 to static position and time criteria that represent activities of interest, such as a criterion identifying telephone calls placed during school hours, or calls to specific numbers or not to specific numbers. If there is a match, then the matching event and criterion are reported in the subroutine 100 of FIG. 4B, discussed below. If there are more events (Step 54), each is reviewed in turn. Similarly, beginning at step 56, for each new position event that is received (such as in the format of FIG. 3B or 3C or 3D), the event is compared 58 to static position and time criteria that represent activities of interest, such as a criterion identifying driving outside of school grounds during school hours, driving at late hours, or driving to suspicious areas known for illegal or immoral activity. If there is a match, then the matching event and criterion are reported in the subroutine 100 of FIG. 4B, discussed below. If there are more events (Step 60), each is reviewed in turn.

After the review of static criteria, in step 62, each new pairing of telecom and vehicle activity events is evaluated to determine if the pair of events meet a criterion relating to simultaneous vehicle and mobile device use. The analysis of two events A and B, where one is a device related event and the other a vehicle event, proceeds by first determining if the event A is an interval or on one time event (step 64). If it is an interval event, and event B is also an interval event (step 66), then concurrent time in the events is identified (step 68), and reported in subroutine 100. If event B is a one time event, then if that event is during the interval of event A (step 72), this is detected and reported in subroutine 100.

If event A is a one time event, then event B is evaluated to determine if it is an interval event or one time event. If event B is an interval event (step 78) then it is determined whether event A occurs during the event B interval, and if so, this is reported 100. If event B is a one-time event (step 82) then it is determined whether the times of events A and B are close enough to be within a threshold, which may be set by the user. For example the user may be interested in simultaneous use events within one minute or 10 minutes of each other. If the events are near enough for the threshold, this is reported 100.

As seen in FIG. 4B, the reporting process compares 102 the event or event pair identified in FIG. 4A to the user's preferences for events to be reported. If the user has set a preference that the event type of interest, e.g. the simultaneous use of the vehicle and the origination of a text message, then a notice of the event or event pair is queued for delivery to the user (step 104). Whether or not the event is queued for notification, it is stored in a history of events 106 for later reference, enabling the user to later survey events for which reports were not delivered but which may be analyzed usefully to identify troublesome behavioral patterns.

While embodiments of the present invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, an unauthorized use of a device or vehicle may be immediately ameliorated via an option of the cellular carrier to disable all but emergency use of the mobile device in response to detection of the unauthorized or proscribed activity. Alternatively, notices may be delivered in such a way as to permit immediate intervention; e.g. the notice may be a text message with a clickable link permitting the responsible person to immediately telephone or text the supervised person to advise of the improper behavior. Accordingly, departures may be made from such details without departing from the spirit or scope of applicants' general inventive concept.

What is claimed is:

1. A method for auditing for the inappropriate use of a mobile device, comprising the computer-implemented steps of:

installing a monitoring device in a motor vehicle, the monitoring device reporting use of the motor vehicle to a remote server;

storing records of motor vehicle use in said remote server, the records reflecting use occurring during a period of time prior to the time the motor vehicle use records are obtained;

storing records of telephone, text or data use of a mobile device via a cellular carrier with which the device is subscribed for service, the records reflecting use occurring during a period of time prior to the time the mobile device use records are obtained;

comparing records of use of the motor vehicle to records of use of the mobile device to identify simultaneous use of the mobile device and motor vehicle based upon time correspondence of uses of the mobile device and motor vehicle and regardless of the relative locations of the motor vehicle and mobile device; and communicating a notice to an auditing person indicating one or both of the time and place of the simultaneous use of the mobile device and motor vehicle.

2. The method of claim 1 wherein the use of the mobile device comprises one or more of:

origination of a telephone connection at a particular time;
receipt of a telephone connection at a particular time;
continuation of a telephone connection over a particular time range;
origination of a text message at a particular time;
receipt of a text message at a particular time;
use of data service at a particular time;
use of data service over a particular time range; and
use of any one of telephone, text or data service in a particular location.

3. The method of claim 1 wherein the use of a vehicle comprises one or more of:

movement of the vehicle above a threshold speed;
position of the vehicle within a specific geographic area.

4. The method of claim 1 further comprising accessing criteria of unacceptable simultaneous use of the mobile device and vehicle and based upon said criteria identifying whether a particular simultaneous use is acceptable according to said criteria.

5. The method of claim 1 further comprising storing a record of a simultaneous use.

6. The method of claim 1 extended to use reference data defining normal activity, further comprising comparing records of use of the motor vehicle to said reference data, and communicating a notice to an auditing person in the event the use data indicates abnormal activity.

7. The method of claim 1 extended to use reference data defining normal activity, further comprising comparing records of use of the mobile device to said reference data, and communicating a notice to an auditing person in the event the use data indicates abnormal activity.

8. The method of claim 1 extended to use reference data defining normal activity, further comprising comparing records of use of the mobile device and motor vehicle to said reference data, and communicating a notice to an auditing person in the event the use data indicates abnormal activity.

9. The method of claim 1 wherein the records of telephone, text or data use of the mobile device are obtained from a database maintained by the cellular carrier.

10. A method for auditing for abnormal or unexpected use of a mobile device and motor vehicle, comprising the computer-implemented steps of:

installing a monitoring device in a motor vehicle, the monitoring device reporting use of the motor vehicle to a remote server;

obtaining records of motor vehicle use in said remote server, the records reflecting use occurring during a period of time prior to the time the motor vehicle use records are obtained;

obtaining records of telephone, text or data use of a mobile device via a cellular carrier with which the device is subscribed for service, the records reflecting use occurring during a period of time prior to the time the mobile device use records are obtained;

storing reference data defining normal or expected activity of one or both of a motor vehicle and mobile device; and comparing said stored records and reference data to identify an abnormal or unexpected use of one or both of the mobile device and motor vehicle that does not fit the normal or expected activity defined by the reference data, the comparison based at least in part upon the time of use of the mobile device or motor vehicle; and communicating a notice to an auditing person indicating one or both of the time and place of the abnormal use of the mobile device and motor vehicle.

11. The method of claim 10 wherein the records of telephone, text or data use of the mobile device are obtained from a database maintained by the cellular carrier.

12. The method of claim 11 wherein said reference data is derived from geographical profiles of historical events.

13. The method of claim 12 wherein the geographical profiles specify behavioral patterns and scenarios for a monitored person.

14. The method of claim 12 wherein the historical events include movements of one or both of a vehicle and mobile device.

15. The method of claim 14 wherein the telecommunication events are identified as one or more of a voice connection, data connection or text messaging.

16. The method of claim 14 wherein the telecommunication events are identified by one or more of the geographical source and geographical destination of the telecommunication.

17. The method of claim 12 wherein the historical events include telecommunication events using the cellular carrier.

18. The method of claim 12 wherein the historical events include one or more of vehicle speed, vehicle engine RPM, vehicle engine running status, and vehicle diagnostic data.

19. The method of claim 10 wherein said reference data is comprises static locations of interest.

* * * * *